Jan. 5, 1965 R. E. DUNAWAY 3,163,884
ELECTRICAL STUNNING OF SMALL STOCK
Filed July 11, 1962 2 Sheets-Sheet 1
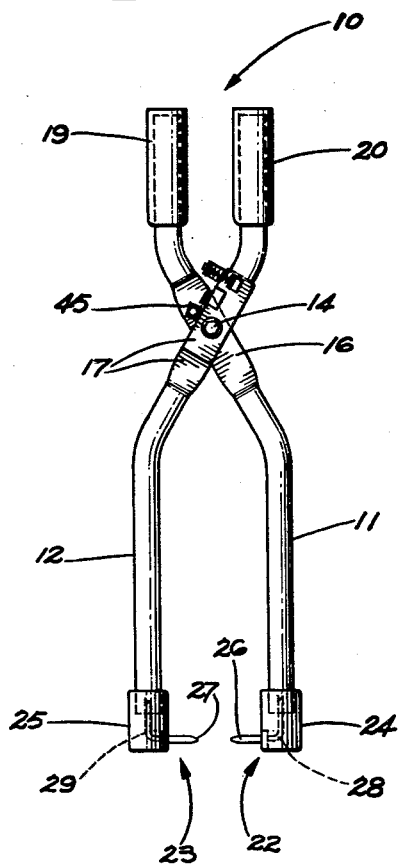
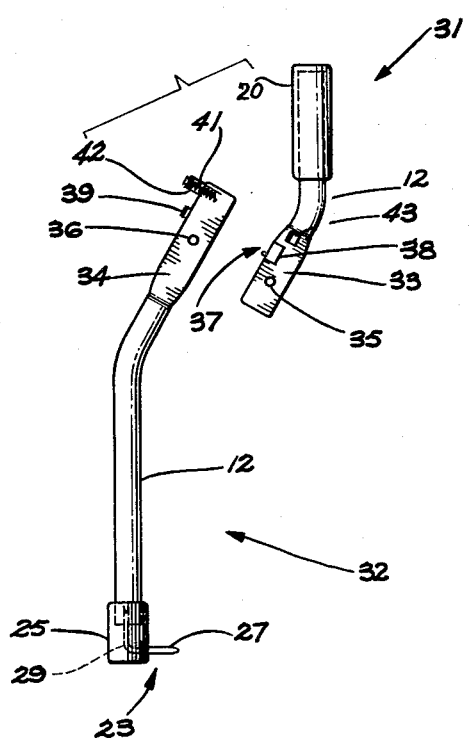
INVENTOR.
Robert E. Dunaway
By Atty
R. G. Story

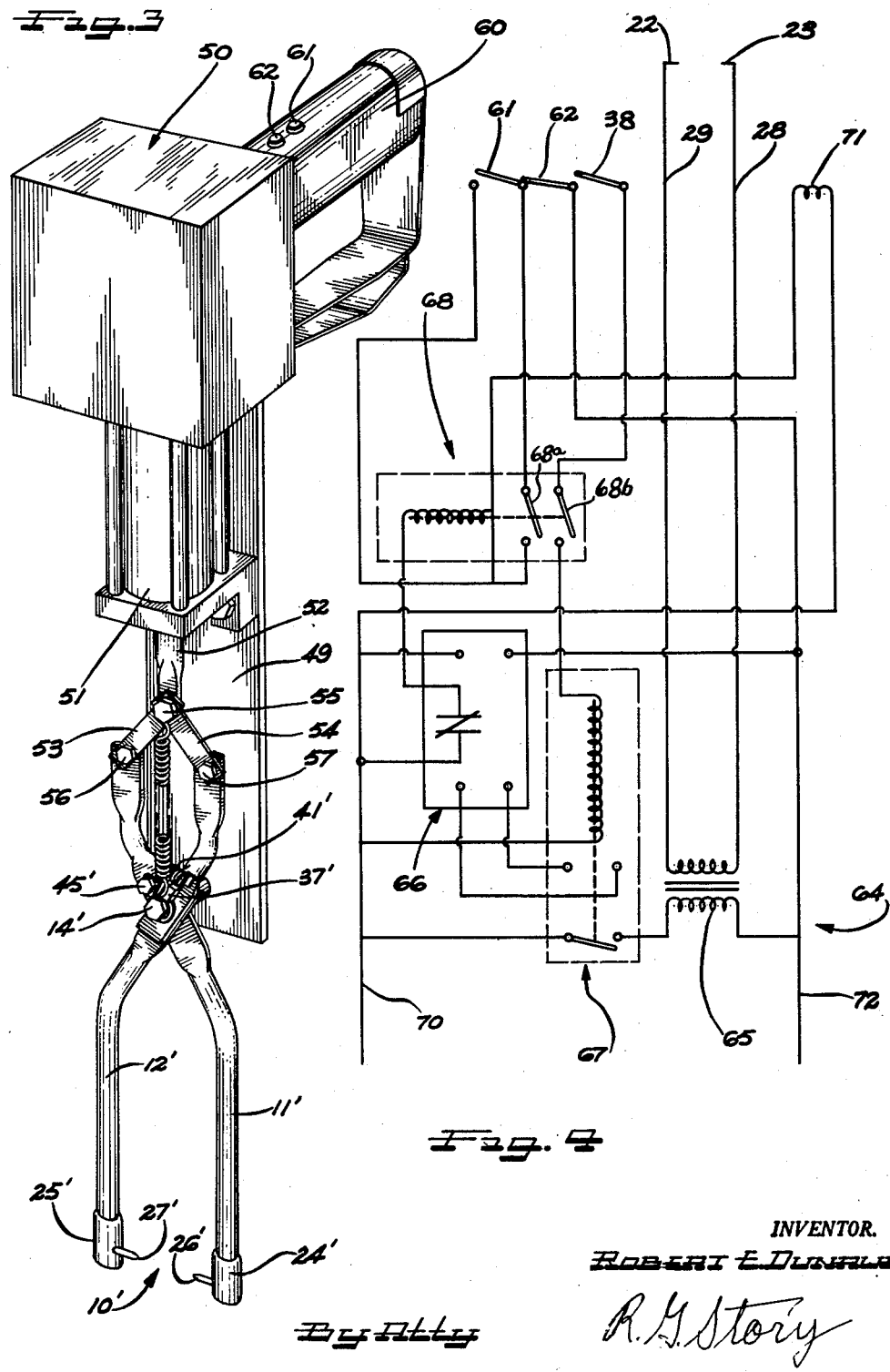

United States Patent Office 3,163,884
Patented Jan. 5, 1965

3,163,884
ELECTRICAL STUNNING OF SMALL STOCK
Robert E. Dunaway, Nashville, Tenn., assignor to Swift & Company, Chicago, Ill., a corporation of Illinois
Filed July 11, 1962, Ser. No. 209,005
4 Claims. (Cl. 17—1)

This invention relates to an apparatus for performing the step of rendering an animal unconscious, known as "stunning" the animal in a slaughtering operation. More specifically, the present invention relates to an apparatus useful for rendering sheep, calves and cattle unconscious by electric shock.

The present invention is an improvement on earlier apparatus such as that shown in the Regensburger Patent No. 2,002,755, which was specifically designed for use in stunning hogs. Prior apparatus of the above-noted type, comprising a tonglike member included a smooth surface electric contact member for engagement with the animal; and its operation depended solely upon the skill and judgment of an operator. Since the effectiveness of electrical stunning depends upon obtaining good electrical contact with the animal, maintaining the good contact throughout the duration of application of an electrical current to the animal, and continuing such application of current for a sufficient period of time to fully render the animal unconscious, it may be seen that effective stunning is very difficult where all of the foregoing factors must be met and determined by an operator. For instance, due to the insulating effect of the hair about an animal's head (particularly where the animal is other than a hog) the type of mechanical contact between the instrument and animal is very important. Additionally, in the stunning of animals such as calves and cattle, which are often stunned without being bodily restrained, there is a pronounced tendency for the animals to fall to the floor immediately upon experiencing an electric charge. This has caused some difficulty for operators to maintain contact of the instrument with the animal for an adequate period to render the animal sufficiently unconscious so that it may be dispatched in subsequent operations without reviving.

Accordingly, it is a principal object of this invention to provide an improved electrical stunning apparatus that lessens the foregoing disadvantages.

It is another object of the present invention to provide an electrical stunning instrument for engaging opposite sides of the head of a sheep, calf or cattle with good electrical contact.

It is a further object of the present invention to provide an improved electrical stunning apparatus for engaging opposite sides of the head of a sheep, calf or cattle so as to insure good electrical contact and which will be in a position to deliver an electrical charge to such animal only when sufficient pressure is exerted to insure continuing good contact with the animal.

It is yet another object of the invention to provide an improved electrical stunning apparatus which is automatic in operation.

Basically the present invention comprises a pair of tongs having at the operating or engaging end thereof a pair of penetrating type electrodes for contacting the opposite sides of an animal's head. This type of structure has the advantage of being able to penetrate the hair of the animal, and to some extent, also, the skin of the animal, so as to insure good electrical contact; and also to a great extent effectively grips the animal so that contact will not be lost if the animal moves. Actuation of the instrument may be mechanical to automatically bring the tongs into engagement with an animal. One of the tong members preferably includes a pressure responsive switch means which is electrically connected with the electrode means and a source of electrical power so as to permit the charge to be delivered to the electrode means only when the latter is forced against an animal with a predetermined pressure. This structure is of even further advantage in insuring good electrical contact with an animal before a stunning charge is delivered. It also is a safety advantage for the operator in that it is less likely to be electrically "hot" when not actually being applied to an animal.

Further objects and advantages of the present invention will become obvious upon reading the following specification in conjunction with the drawings wherein:

FIGURE 1 is a view of a manually operated embodiment of the present invention;

FIGURE 2 is a view of part of the apparatus of FIGURE 1 disassembled so as to illustrate one form of a pressure responsive switch means;

FIGURE 3 is a view of a power operated embodiment of the present invention; and

FIGURE 4 is a wiring diagram of a control apparatus for operating the device of FIGURE 3.

Referring to FIGURES 1 and 2, it may be seen that the present stunning apparatus comprises a pair of tongs generally 10. Two tong members 11 and 12 are bent to appropriate shape and the tongs are typically connected together by a connecting bolt 14. Preferably the tong members 11 and 12 are each constructed of tubular stock such as ½-inch diameter galvanized steel conduit. Each tong member has a flattened area 16, 17 located at the pivoted connection. In practice it has been found that such an apparatus having an over-all length of approximately 34½ inches is suitable for stunning calves. The pivot point of such an apparatus is located approximately 20½ inches from the animal contacting end of the apparatus. The shorter end of the tongs generally 10 has force applying means such as handle grips 19, 20 manufactured of an electrically nonconductive material. The animal contacting ends of the tongs have electrode means 22, 23 comprising a head of insulating material 24, 25, each having a single penetrating type electrode contact member 26, 27 disposed in a direction opposing that of the opposite member. Each contact member 26, 27 is connected by wires 28, 29, respectively, to a power supply and control means to be later explained.

One of the tong members 12 consists of two separate parts. These parts comprise a handle piece 31 and an animal contact piece 32. As may be best seen in FIGURE 2, both of the two parts have flattened ends 33, 34 which are overlapped at the pivot point and each contains a bolt hole 35, 36 for the connecting bolt 14. A pressure responsive electrical means generally 37 is mounted on one flattened end; and a resilient means such as a compression spring 41 is fastened between the two parts of tong member 12 so that both parts will pivot substantially together about the connecting bolt 14 but may be angularly displaced to different extents by compressing the spring 41. I have found that a .042-inch gage steel wire spring 25/32 inch long, ⅜ inch diameter having six turns per inch is satisfactory.

The pressure responsive electrical means generally 37 comprises a snap action switch 38 mounted on the flattened end 33 of the handle piece 31. A switch tripping dog 39 is mounted on an edge of the flattened end 34 of the contact piece 32 so as to engage the snap action switch 38 when the two parts are displaced at different angles. The spring 41, however, which is connected between a mounting bracket 42 on contact piece 32 and a seat 43 on the handle piece 31 tends to hold the switch 38 and dog 39 apart when uncompressed.

Thus, when the tongs 11 and 12 are pivoted to bring the electrode means 22, 23 toward one another the snap action switch 38 will not be closed until some object between the electrode means resists their movement so as to cause relative displacement of the two flattened ends 33, 34. At that time continued pressure on the handle grips 19, 20 will move the handle piece 31 so as to eventually, when sufficient pressure is exerted, bring the snap action switch 38 into contact with the dog 39 thereby closing the switch. A force of about three pounds at the handles has been sufficient in the described apparatus. Wiring of the apparatus itself or its companion control means is arranged so that one or both of the electrode means 22, 23 are not connected to the source of power (not shown) until the switch 38 is closed.

Additionally, a stop lug 45 is mounted upon the flattened area 16 of the unitary tong member 11 so as to limit the pivotal travel of the other tong member 12 and thereby maintain at all times at least a minimum displacement between the two electrode means 22, 23.

The foregoing apparatus is manually operated in a manner that will now have become obvious. However, the apparatus may be readily adapted to automatic operation. As is illustrated in FIGURE 3, the force applying means of the apparatus may be an actuating means generally 50 for mechanically powered, rather than manual, operation. In the embodiment shown in FIGURE 3, elements of the apparatus similar to those described above are identified by the same reference characteristics bearing a prime exponent.

In the latter embodiment the elements of the apparatus are pivotally mounted by connecting bolt 14' on one end of a frame member 49. Preferably the actuating means takes the form of a pneumatic cylinder 51 having a reciprocable actuating rod 52 extending from one end thereof. The actuating means 50 is mounted upon the frame 49 with the actuating rod 52 linked to the short ends of tongs 11' and 12' by linking bars 53, 54, respectively. The linking bars are connected to the actuating rod 52 by a single pivot pin 55, and to the respective tong members 11' and 12' by pivot pins 56, 57. Additionally, a tension spring is connected between the pivot pin 55 and the connecting bolt 14' to normally extend the actuating rod 52 of the actuating means so as to move the tongs generally 10' to the open position. A hand grip 60 is connected to the opposite end of the frame 49 from the connecting bolt 14'. The hand grip contains a trigger switch 61 for actuation of the apparatus as will be hereinafter described, and also a release switch 62 for deactivating the apparatus if desired.

The actuating means generally 50 could also take the form of a solenoid device; however, due to power requirements, it is preferred to use a pneumatic cylinder as illustrated. The pneumatic cylinder 51 is actuated in a conventional fashion by a valve and source of air under pressure, not shown.

The power supply and control means generally 64 is illustrated in FIGURE 4. One form of such a control means, as illustrated, comprises a transformer 65 for stepping up house voltage to the desired level which may be as high as about 750 to 950 volts for the stunning of calves or cattle with about 850 volts being preferred. The control means also includes a timer generally 66 for regulating the period of time that a stunning current will be applied to an animal, and also the period of time that the tongs 10' of the automatic apparatus of FIGURE 3 will be closed upon an animal. The transformer 65 and timer 66 are operated by means of an actuating relay generally 67 and a holding relay generally 68. In the circuit illustrated in FIGURE 4 a wire 70 connected to one side of the source of power is also connected directly to the timer 66, the actuating relay 67 and to a solenoid 71 which may either be the actuating means, generally 50, itself, or a solenoid to operate an air valve, not shown, in conjunction with the pneumatic cylinder 51.

A second wire 72 is connected to the opposite side of the source of electric power and also to the transformer 65, the timer 66, and to the switches on the stunning instrument including the release switch 62, trigger switch 61 and pressure responsive switch 38.

As may be followed in the diagram of FIGURE 4, the release switch 62 is normally closed while the trigger switch 61 and pressure responsive switch 38' are normally open. When the trigger switch of the automatic acting device is closed, the coil of holding relay 68 is energized to close two connected relay switches 68a and 68b. One of those switches 68a is connected back through the normally closed release switch 62 to the source of power whereby when the relay is once energized it will be held in the same position even though the trigger switch is released so long as the release switch 62 remains closed. The opposite side of the relay coil is connected through the timer to the source of electric power.

The timer switch, as illustrated, is normally closed. The second switch 68b of the relay 68 is connected to one side of a coil in the actuating relay 67. The opposite side of the coil is connected directly to one side of the source of power. This coil will be energized when the pressure responsive siwtch 38' is closed (after the trigger switch 61 is first closed). Thus when the pressure responsive switch 38' is closed and the holding relay is energized, power will be connected to the transformer 65 and stepped up voltage immediately delivered to the two electrode means 22, 23.

At the same time, an actuating switch for the timer 66 will be opened to begin the timer run-down. When this period is completed the timer will disconnect current to the coil of holding relay 68 thus breaking the connection to the actuating relay 67 and de-energizing the transformer. At that time, the timer is reset to commence the next cycle.

It will also be noted that the solenoid 71 is connected directly to wire 70 and is also connected, indirectly, with wire 72 parallel to the coil of relay 68. Thus, during the periods that relay 68 is energized the solenoid 71 will also be energized; and when the relay 68 is de-energized the solenoid will likewise be de-energized. Thus, from the moment that trigger switch 61 is closed until either the release switch 62 is opened or the timer switch is opened, the solenoid 71 will be energized. Power will be delivered to the electrode means 22 and 23 immediately upon closing of pressure sensitive switch 38'. The stunning charge and energization of solenoid 71 and simultaneously.

Thus, if the actuating means generally 50 of the stunning instrument is a solenoid, the actuating rod 52 may be withdrawn directly thereby and thus hold the instrument closed during that period. However, where the actuating means generally 50 is the pneumatic cylinder 51, illustrated, the solenoid is connected to direct air thereto to withdraw the actuating rod 52 during that period; and when the solenoid 71 becomes de-energized, the actuating rod 52 is returned to open the tongs by the tension spring 58.

Obviously many modifications and variations of the invention as hereinbefore set forth may be made without departing from the spirit and scope thereof; for instance, in the power operated embodiment the pressure responsive switch means 37' could be operated directly by the actuating means generally 50 upon a required amount of force being exerted by that unit, or the actuating means itself could be carefully designed to always move the tong members with sufficient force to properly engage the animal and thus in some instances the pressure responsive switch could be eliminated. Therefore only such limitations should be imposed as are indicated in the appended claims.

I claim:
1. An improved electrical stunning instrument for rendering animals unconscious, said instrument comprising: a pair of pivotally connected tong members, one of said tong members consisting of two parts, each part being pivotally connected to the other tong member; a spring connected between the two parts of said one tong member so as to transmit force between said parts and permit separate angular displacement of said parts when forces are applied to one end of said tongs; a switch mounted on one of said parts to be actuated when a certain force is applied across said spring; electrodes connected to one end of each of said tongs, said electrodes being opposingly mounted for engaging the sides of an animal's head, and being electrically connectable with a source of power by said switch upon said certain force being applied across said spring; a reciprocable power actuating means connected to ends of said tongs opposite said one end thereof, operable to pivot said tongs to move said electrodes toward one another; and means connected to at least one of said actuating means and tong members to normally urge said electrodes apart.

2. The apparatus of claim 1 wherein the power actuating means is a pneumatic device.

3. An improved electrical stunning instrument for rendering sheep and calves unconscious, said instrument comprising: a frame; a pair of tong members pivotally connected together and to said frame at a pivot point; penetrating electrodes connected to the ends of said tongs, said electrodes being opposingly mounted for engaging the sides of an animal's head and being electrically connectable with a source of electric power upon an animal being engaged by said electrodes; an actuating means attached to said frame, said actuating means having an actuating rod extending therefrom; connecting links pivotally attached between said actuating rod and each of said tong members; a spring connected between said actuating rod and said pivot point to normally tend to move the tongs to an open position; a control switch mounted on said frame; and a control means connected to said control switch to supply power to said actuating means upon said control switch being actuated and to maintain power thereto throughout the interval of time that electric power is connected to said electrodes.

4. An improved electrical stunning instrument for rendering sheep and calves unconscious, said instrument comprising: a frame; a pair of tong members pivotally connected together and to said frame at a pivot point, one of said tong members consisting of two parts, each part being pivotally connected to the other tong member at said point; a compression spring connected between the two parts of said one tong member so as to transmit force between said parts and permit separate angular displacement of said parts when forces are applied to one end of said tong; a first switch mounted on one of said parts to be actuated to connect with a first electric source when a certain force is applied across said spring; penetrating electrodes connected to the ends of said tongs, said electrodes being opposingly mounted for engaging the sides of an animal's head, and being electrically connectible with a second source of electric power upon said switch being actuated; an actuating means attached to said frame, said actuating means having an actuating rod extending therefrom; connecting links pivotally attached between said actuating rod and each of said tong members; a spring connected between said actuating rod and said pivot point to normally tend to move the tongs to an open position; a control switch mounted on said frame; and a control means connected to said control switch and said first switch, said control means including a timer and said first and second electric sources connected to supply power to said actuating means by said first source upon said control switch being actuated and to supply power to said electrodes by said second source upon said first switch being actuated and to thereafter continue said electric power to both said actuating means and said electrodes for a period established by said timer.

References Cited in the file of this patent

UNITED STATES PATENTS 3,055,046    Hlavacek et al.    Sept. 25, 1962

FOREIGN PATENTS 384,565    Great Britain    Dec. 8, 1932
427,741    Great Britain    Apr. 23, 1935